United States Patent
Ellis et al.

(10) Patent No.: US 11,755,090 B2
(45) Date of Patent: Sep. 12, 2023

(54) REAL-TIME COMMUNICATION OF POWER SUPPLY UNIT POWER LOADING STATUS

(71) Applicant: Dell Products L.P., Round Rock, TX (US)

(72) Inventors: Mark T. Ellis, Austin, TX (US); Adolfo S. Montero, Pflugerville, TX (US)

(73) Assignee: Dell Products L.P., Round Rock, TX (US)

( * ) Notice: Subject to any disclaimer, the term of this patent is extended or adjusted under 35 U.S.C. 154(b) by 89 days.

(21) Appl. No.: 17/407,363

(22) Filed: Aug. 20, 2021

(65) Prior Publication Data
US 2023/0054476 A1  Feb. 23, 2023

(51) Int. Cl.
*G06F 1/3206* (2019.01)
*G06F 13/24* (2006.01)
*G06F 1/26* (2006.01)
*G06F 1/3234* (2019.01)
*G06F 1/28* (2006.01)

(52) U.S. Cl.
CPC ........... *G06F 1/3206* (2013.01); *G06F 1/266* (2013.01); *G06F 1/28* (2013.01); *G06F 1/3234* (2013.01); *G06F 13/24* (2013.01)

(58) Field of Classification Search
CPC . G06F 1/26; G06F 1/263; G06F 1/266; G06F 1/28; G06F 1/30; G06F 1/305; G06F 1/3206; G06F 1/3212; G06F 1/3234; G06F 3/05; G06F 13/24
See application file for complete search history.

(56) References Cited

U.S. PATENT DOCUMENTS

| | | | |
|---|---|---|---|
| 9,906,143 B1 | 2/2018 | Yu et al. | |
| 11,340,673 B1* | 5/2022 | Sodani | G06F 1/10 |
| 2006/0100002 A1* | 5/2006 | Luebke | G06F 3/0362 |
| | | | 455/343.1 |
| 2007/0139898 A1* | 6/2007 | Yang | G06F 11/26 |
| | | | 361/760 |

(Continued)

OTHER PUBLICATIONS

"Understanding Flash ADCs". Tutorial 810. Maxim Integrated Products, Inc. 2014. (Year: 2014).*

(Continued)

*Primary Examiner* — Thomas J. Cleary
(74) *Attorney, Agent, or Firm* — Larson Newman, LLP

(57) ABSTRACT

An information handling system includes a power supply unit (PSU) and a motherboard. The PSU provides power to components of the information handling system, and includes power monitoring circuitry and digital-to-analog (D/A) circuitry. The power monitoring circuitry of the PSU determines whether the provided power exceeds one of a plurality of thresholds during a respective one of a plurality of time periods, and provides a digital value on one of a plurality of pins based on one of the threshold voltages being exceeded during the corresponding time period. The D/A circuitry of the PSU detects the digital value on one of the pins, and provides one of a plurality of quantized voltages. Each of quantized voltages corresponds to a different one of the pins. The motherboard receives the one of quantized voltages, and activates a throttling operation based on the received one of quantized voltages.

18 Claims, 4 Drawing Sheets

(56) References Cited

U.S. PATENT DOCUMENTS

| | | | | |
|---|---|---|---|---|
| 2008/0320322 | A1* | 12/2008 | Green | G06F 1/3203 |
| | | | | 713/340 |
| 2014/0189376 | A1* | 7/2014 | Rotem | G06F 1/3296 |
| | | | | 713/300 |
| 2015/0028843 | A1* | 1/2015 | Karlsson | G05F 1/565 |
| | | | | 323/351 |
| 2015/0102833 | A1* | 4/2015 | Bhatia | G01R 19/16552 |
| | | | | 324/762.01 |
| 2015/0115971 | A1* | 4/2015 | Kim | G01R 31/3835 |
| | | | | 324/426 |
| 2015/0286198 | A1* | 10/2015 | Sugeno | G06F 11/0739 |
| | | | | 700/295 |
| 2019/0265776 | A1* | 8/2019 | Montero | G06F 1/3206 |
| 2019/0324872 | A1 | 10/2019 | Lingappa et al. | |
| 2020/0110454 | A1* | 4/2020 | Yang | G06N 3/08 |
| 2021/0334187 | A1* | 10/2021 | Sewani | G06F 21/81 |
| 2022/0091650 | A1* | 3/2022 | Thompson | G06F 1/28 |

OTHER PUBLICATIONS

Taher, Farah Naz. "A Low-Power Analog Bus for On-Chip Digital Communication". Auburn University. 2013. (Year: 2013).*

* cited by examiner

REAL-TIME COMMUNICATION OF POWER SUPPLY UNIT POWER LOADING STATUS

FIELD OF THE DISCLOSURE

The present disclosure generally relates to real-time communication of a power supply unit power loading status in an information handling system.

BACKGROUND

As the value and use of information continues to increase, individuals and businesses seek additional ways to process and store information. One option is an information handling system. An information handling system generally processes, compiles, stores, or communicates information or data for business, personal, or other purposes. Technology and information handling needs and requirements can vary between different applications. Thus information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, graphics interface systems, data storage systems, networking systems, and mobile communication systems. Information handling systems can also implement various virtualized architectures. Data and voice communications among information handling systems may be via networks that are wired, wireless, or some combination.

SUMMARY

An information handling system includes a power supply unit and a motherboard. The power supply unit provides power to components of the information handling system, and includes power monitoring circuitry and digital-to-analog (D/A) circuitry. The power monitoring circuitry may determine whether the provided power exceeds one of a plurality of thresholds during a respective one of a plurality of time periods, and provide a digital value on one of a plurality of pins based on one of the threshold voltages being exceeded during the corresponding time period. The D/A circuitry may detect the digital value on one of the pins, and provide one of a plurality of quantized voltages. Each of quantized voltages corresponds to a different one of the pins. The D/A circuitry may prioritize the quantized voltages such that a most time critical event, such as an event that occurs in a microsecond range of time, has higher priority and is sent before a least critical event, such as an event that is associated with an average power usage. In this manner, the D/A circuitry may properly resolve competing parallel events received from the power monitoring circuitry. The motherboard may receive the one of quantized voltages, and activate a throttling operation based on the received one of quantized voltages.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION OF THE DRAWINGS

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

Figure 1:
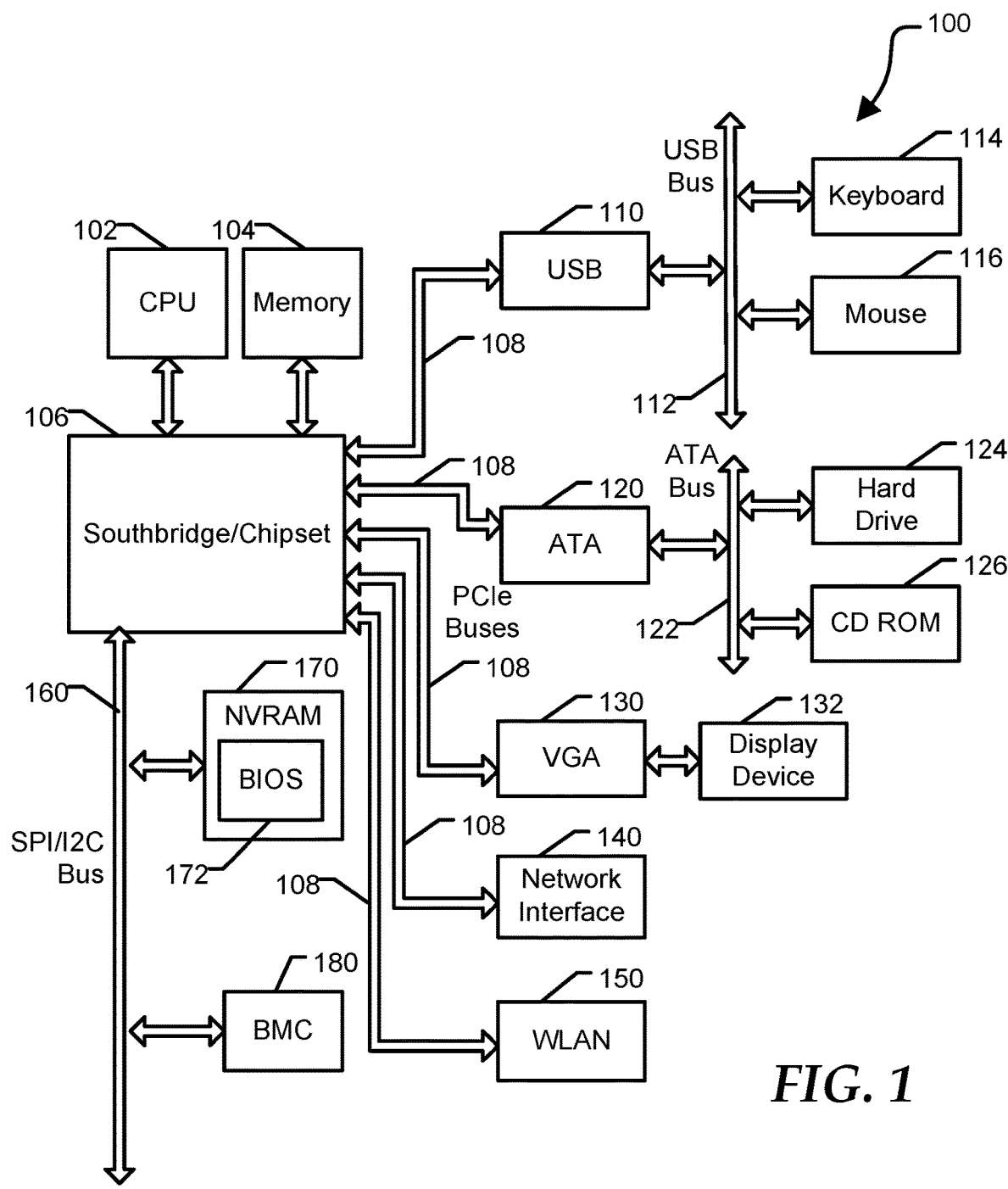
FIG. 1 is a block diagram of a general information handling system according to an embodiment of the present disclosure.

FIG. 1 illustrates a general information handling system 100. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a PDA, a consumer electronic device, a network server or storage device, a switch router or other network communication device, or any other suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various other I/O devices, such as a keyboard, a mouse, and a video display. The information handling system may also include one or more busses operable to transmit communications between the various hardware components.

Information handling system 100 including a processor 102, a memory 104, a southbridge/chipset 106, one or more PCIe buses 108, a universal serial bus (USB) controller 110, a USB 112, a keyboard device controller 114, a mouse device controller 116, a configuration an ATA bus controller 120, an ATA bus 122, a hard drive device controller 124, a compact disk read only memory (CD ROM) device controller 126, a video graphics array (VGA) device controller 130, a network interface controller (NIC) 140, a wireless local area network (WLAN) controller 150, a serial peripheral interface (SPI) bus 160, a NVRAM 170 for storing BIOS 172, and a baseboard management controller (BMC) 180. In an example, chipset 106 may be directly connected to an individual end point via a PCIe root port within the chipset and a point-to-point topology as shown in FIG. 1. BMC 180 can be referred to as a service processor or embedded controller (EC). Capabilities and functions provided by BMC 180 can vary considerably based on the type of information handling system. For example, the term baseboard management system is often used to describe an embedded processor included at a server, while an embedded controller is more likely to be found in a consumer-level device. As disclosed herein, BMC 180 represents a processing device different from CPU 102, which provides various management functions for information handling system 100. For example, an embedded controller may be responsible for power management, cooling management, and the like. An embedded controller included at a data storage system can be referred to as a storage enclosure processor.

System 100 can include additional processors that are configured to provide localized or specific control functions, such as a battery management controller. Bus 160 can include one or more busses, including a SPI bus, an I2C bus, a system management bus (SMBUS), a power management bus (PMBUS), and the like. BMC 180 can be configured to provide out-of-band access to devices at information handling system 100. As used herein, out-of-band access herein refers to operations performed prior to execution of BIOS 172 by processor 102 to initialize operation of system 100.

BIOS 172 can be referred to as a firmware image, and the term BIOS is herein used interchangeably with the term firmware image, or simply firmware. BIOS 172 includes instructions executable by CPU 102 to initialize and test the hardware components of system 100, and to load a boot loader or an operating system (OS) from a mass storage device. BIOS 172 additionally provides an abstraction layer for the hardware, such as a consistent way for application programs and operating systems to interact with the keyboard, display, and other input/output devices. When power is first applied to information handling system 100, the system begins a sequence of initialization procedures. During the initialization sequence, also referred to as a boot sequence, components of system 100 are configured and enabled for operation, and device drivers can be installed. Device drivers provide an interface through which other components of the system 100 can communicate with a corresponding device.

Information handling system 100 can include additional components and additional busses, not shown for clarity. For example, system 100 can include multiple processor cores, audio devices, and the like. While a particular arrangement of bus technologies and interconnections is illustrated for the purpose of example, one of skill will appreciate that the techniques disclosed herein are applicable to other system architectures. System 100 can include multiple CPUs and redundant bus controllers. One or more components can be integrated together. For example, portions of southbridge/chipset 106 can be integrated within CPU 102. Additional components of information handling system 100 can include one or more storage devices that can store machine-executable code, one or more communications ports for communicating with external devices, and various input and output (I/O) devices, such as a keyboard, a mouse, and a video display. An example of information handling system 100 includes a multi-tenant chassis system where groups of tenants (users) share a common chassis, and each of the tenants has a unique set of resources assigned to them. The resources can include blade servers of the chassis, input/output (I/O) modules, Peripheral Component Interconnect-Express (PCIe) cards, storage controllers, and the like.

Figure 2:
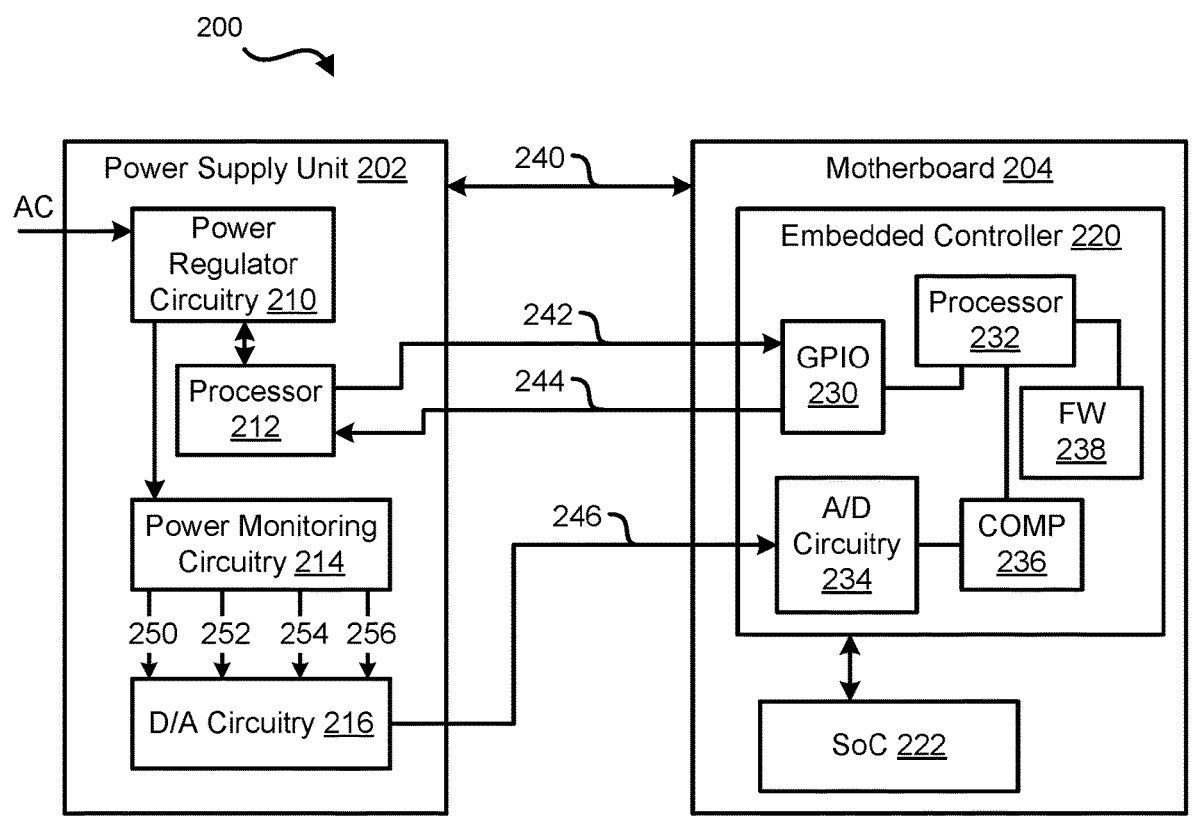
FIG. 2 is a diagram of internal components of a power supply in communication with a motherboard of an information handling system according to at least one embodiment of the present disclosure.

In an example, information handling system 100 may be any suitable device including, but not limited to, information handling system 200 of FIG. 2. Information handling system 100 can include a set of instructions that can be executed to cause the information handling system to perform any one or more of the methods or computer based functions disclosed herein. The information handling system 100 may operate as a standalone device or may be connected to other computer systems or peripheral devices, such as by a network.

In a networked deployment, the information handling system 100 may operate in the capacity of a server or as a client user computer in a server-client user network environment, or as a peer computer system in a peer-to-peer (or distributed) network environment. The information handling system 100 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 100 can be implemented using electronic devices that provide voice, video or data communication. Further, while a single information handling system 100 is illustrated, the term "system" shall also be taken to include any collection of systems or sub-systems that individually or jointly execute a set, or multiple sets, of instructions to perform one or more computer functions.

The information handling system 100 can include a disk drive unit and may include a computer-readable medium, not shown in FIG. 1, in which one or more sets of instructions, such as software, can be embedded. Further, the instructions may embody one or more of the methods or logic as described herein. In a particular embodiment, the instructions may reside completely, or at least partially, within system memory 104 or another memory included at system 100, and/or within the processor 102 during execution by the information handling system 100. The system memory 104 and the processor 102 also may include computer-readable media.

FIG. 2 illustrates a portion of an information handling system 200 according to at least one embodiment of the present disclosure. Information handling system 200 includes a power supply unit 202 and a motherboard 204. Power supply unit 202 includes power regulator circuitry 210, a processor 212, power monitoring circuitry 214, and digital-to-analog (D/A) converter circuitry 216. In an example, processor 212 may be any suitable microcontroller, such as a house keeping integrated circuit. Motherboard 204 includes an embedded controller 220 and a system on a chip (SoC) 222. Embedded controller includes a general purpose input/output (GPIO) device 230, a processor 232, A/D circuitry 234, a comparator 236, and firmware 238. In an example, SoC 222 may include any suitable components for executing code of firmware 238, such as processor, a graphics processing unit, and a platform controller hub. In an example, information handling system 200 may include additional components without varying from the scope of this disclosure.

During operation, power supply unit 202 may receive power from an alternating current (AC) source. Power regulator circuitry 210 may covert the AC power into a direct current (DC), and provides the DC power to components of information handling system 200 including, but not limited to motherboard 204. In certain examples, power supply unit 202 may communicate with motherboard 204 via any suitable communication pins including, but not limited to, an inter-integrated circuit (I²C) bus 240, a Power Good (PwrGood) pin 242, a PSON pin 244, and a Power Alarm (PwrAlarm) pin 246. Communication between power supply unit 202 may include latency in the delivery of the data across the serial bus. In an example, processor 212 may monitor the operation of power regulator circuitry 210, and may provide different data about the health of power regulator circuitry 210 to embedded controller 230 via PwrGood pin 242 and GPIO 230. In response to the data, processor 232, such as a microcontroller, may provide control data to power supply unit 202 via PSON pin 244.

In certain examples, power supply unit 202 may provide different power delivery capabilities to the components of information handling system 200 depending on a particular time domain or length of time. For example, power supply unit 202 may provide a very high current spike to support a CPU/GPU turbo performance mode, but this power may be providing only for a short period of time. However, even if power supply unit 202 may support the CPU/GPU turbo performance mode, other components in information handling system 200 may draw power at the same time and may cause power limits to be exceeded.

In previous information handling systems, power usage circuitries may be located on the motherboard. However, each component of the information handling system, may receive power via a separate harness cable. In these situations, if the power measurements were performed on the motherboard, an information handling system would needed multiple monitoring circuitries to connect to each separate power harness. Previous information handling systems may include oversized power supply units to handle worst case conditions so that a crowbar condition and loss of data does not occur in the information handling system. Additionally, power measurements made in the motherboard may not be as accurate as power measurements in the power supply unit because of resistive losses in the distribution network between the power supply unit and the motherboard. Thus, power supply unit 202 may improve power measurements in information handling system 200 by performing power measurements within the power supply unit and provide one or more alarms to motherboard 204 via PwrAlarm pin 246.

During operation of power supply unit 202, power monitoring circuitry 214 may monitor the power provided by power regulator circuitry 210. For example, power monitoring circuitry 214 may calculate an average power over any suitable number of time periods or time domains. In an example, the power provided by power supply unit 202 may change from on instance to another. In this situation, power monitoring circuitry 214 may calculate an 'area under the curve' for the power provided by power regulator circuitry 210. In an example, the 'area under the curve' may be an average amount of power during a particular time window or amount of time. For example, the time window or amount of time may be any suitable length of time including, but not limited to, 1 second, 20 milliseconds, and 10 microseconds.

Power monitoring circuitry 214 may compare the power provided by power regulator circuitry 210 to multiple different thresholds in parallel. In an example, power monitoring circuitry 214 may utilize three different thresholds, each of which is associated with a different time period. One of ordinary skill in the art would recognize that power monitoring circuitry 214 may utilize any number of threshold voltages and any number of time periods without varying from the scope of this disclosure.

In an example, while the average power from power regulator circuitry 210 is compared to multiple thresholds in parallel, the individual comparisons will be described one-by-one for clarity. Power monitoring circuity 214 may determine whether the average amount of power drawn from power regular circuitry 210 is below a first threshold during a first time period. In an example, the first time period may be a rolling one second time window, and the first threshold voltage may be any suitable voltage that power supply unit may continually provide without shutting down. The first threshold voltage may include, but is not limited to, 90 Watts and 100 Watts. In response to the average amount of power during the first time period being less than the first threshold voltage, power monitoring circuitry 214 may provide a voltage to D/A circuitry 216 on a power alright pin 250.

In an example, the voltage may be a digital value, such as a logical high value. In response to detecting the voltage on pin 250, D/A circuitry 216 may provide a voltage to embedded controller 220 via PwrAlarm pin 246. In an example, the voltage on PwrAlarm pin 246 may be any suitable voltage, such as 0 Volts. In an example, the analog voltage provided on PwrAlarm pin 246 may significantly reduce latency that would be introduced in alarm signals were provided via the I²C bus 240. In response to detecting 0 Volts on PwrAlarm pin 246, D/A circuitry 234 may convert the voltage into a digital value and provide the digital voltage to comparator 236. In this situation, comparator 236 may provide processor 232 an indication that no throttling action may be needed.

Power monitoring circuity 214 may determine whether the average amount of power drawn from power regular circuitry 210 is greater than the first threshold during the first time period. In response to the average amount of power during the first time period being greater than the first threshold voltage, power monitoring circuitry 214 may provide a voltage to D/A circuitry 216 on a '1 second' pin 252. In an example, the voltage may be a digital value, such as a logical high value. In response to detecting the voltage on pin 252, D/A circuitry 216 may provide a voltage to embedded controller 220 via PwrAlarm pin 246. In an example, the voltage on PwrAlarm pin 246 may be any suitable voltage, such as 1.1 Volts. In response to detecting 1.1 Volts on PwrAlarm pin 246, D/A circuitry 234 may convert the voltage into a digital value and provide the digital voltage to comparator 236. In this situation, processor 232 may reduce a power level 1 limit by a predetermined wattage amount, such as 5 Watts. In an example, the reduction of power level 1 may reduce an amount of power consumed by the components of information handling system 200.

In an example, power monitoring circuity 214 may determine whether the average amount of power drawn from power regular circuitry 210 is greater than a second threshold during a second time period. In response to the average amount of power during the second time period being greater than the second threshold voltage, power monitoring circuitry 214 may provide a voltage to D/A circuitry 216 on a '20 millisecond' pin 254. In response to detecting the voltage on pin 254, D/A circuitry 216 may provide a voltage to embedded controller 220 via PwrAlarm pin 246. In an example, the voltage on PwrAlarm pin 246 may be any suitable voltage, such as 2.2 Volts. In response to detecting 2.2 Volts on PwrAlarm pin 246, D/A circuitry 234 may convert the voltage into a digital value and provide the digital voltage to comparator 236. In this situation, processor 232 may reduce a power level 2 limit by the predetermined wattage amount.

In certain examples, power monitoring circuit 214 may determine whether the average amount of power drawn from power regular circuitry 210 is greater than a third threshold during a third time period. In response to the average amount of power during the second time period being greater than the third threshold voltage, power monitoring circuitry 214 may provide a voltage to D/A circuitry 216 on a '10 microsecond' pin 256. In response to detecting the voltage on pin 256, D/A circuitry 216 may provide a voltage to embedded controller 220 via PwrAlarm pin 246. In an example, the voltage on PwrAlarm pin 246 may be any suitable voltage, such as 3.3 Volts. In response to detecting 3.3 Volts on PwrAlarm pin 246, D/A circuitry 234 may convert the voltage into a digital value and provide the digital voltage to comparator 236. In this situation, processor 232 may activate power throttling. In an example, the power throttling may be any suitable throttling command including, but not limited to, PROCHOT # and power-brake.

In an example, D/A circuitry 216 may be coarse D/A circuitry with an analog output that may be segmented enough to avoid voltage precision errors of a full 10-bit D/A range. For example, D/A circuitry 216 may provide four distinct outputs, such that an equivalent D/A circuit would be a 2-bit D/A. In this example, A/D circuitry 234 may be a 10-bit A/D, such that the outputs from D/A circuitry 216 may be read by A/D circuitry of motherboard 204 to guarantee the reading will be correctly re-mapped to one of the original four outputs.

In an example, if D/A circuitry 216 detects the voltage on multiple pins of pins 250, 252, 254, and 256, the D/A circuitry may provide the quantized voltage on PwrAlarm pin 246 based on priority levels assigned to the alarms. For example, '1 second', '20 millisecond', and '10 millisecond' power alarms may be assigned different priority levels depending on how the different power levels may affect power supply unit 202. D/A circuity 216 may provide the voltage level associated with the highest priority level on PwrAlarm pin 246 when multiple alarms are detected at substantially the same time.

In an example, comparator 236 may instantly create an EC interrupt based on the receive power supply unit alarm on PwrAlarm pin 246. In this example, processor 232 of embedded controller 220 may respond to the alarm in times substantially faster than if the alarm was provided via I²C bus 240. In an example, the alarm signal voltages may enable a real-time response to a change in system-side power loading before losing power supply unit 202 regulation. Additionally, the power monitoring in power supply unit 202 enables more accurate measurements without motherboard 204 having to adjust power measurements based on different power supply units or having to adjust power measurements based on power loses in the distribution network. In certain examples, power monitoring circuitry 214 may monitor for different threshold levels depending on a particular power supply unit 202. However, D/A circuitry 216 may provide the same quantized voltage level alarms on PwrAlarm pin 246. In an example, these implementations may reduce complexity in embedded controller 220 for determining when power throttling is needed.

Information handling system 200 is improved by the combination of power monitoring circuitry 214 and D/A circuitry 216 quantizing the multiple power alarms into a single pin provided to motherboard 204. One such improvement may be a reduction in an amount of cabling and/or connectors needed to provide the necessary communication between power supply unit 202 and motherboard 204 to monitor the described power alarms. Additionally, information handling system 200 may be improved by providing a scalability of the multiple alarms into the signal pin 246 by utilizing multiple levels a single signal provided over pin 246. Further, a response time for the analog signal on pin 246 to change from one value to the next in real-time is substantially quicker than performing a power alarm query over I²C bus 240 which has a much slower response time.

Figure 3:
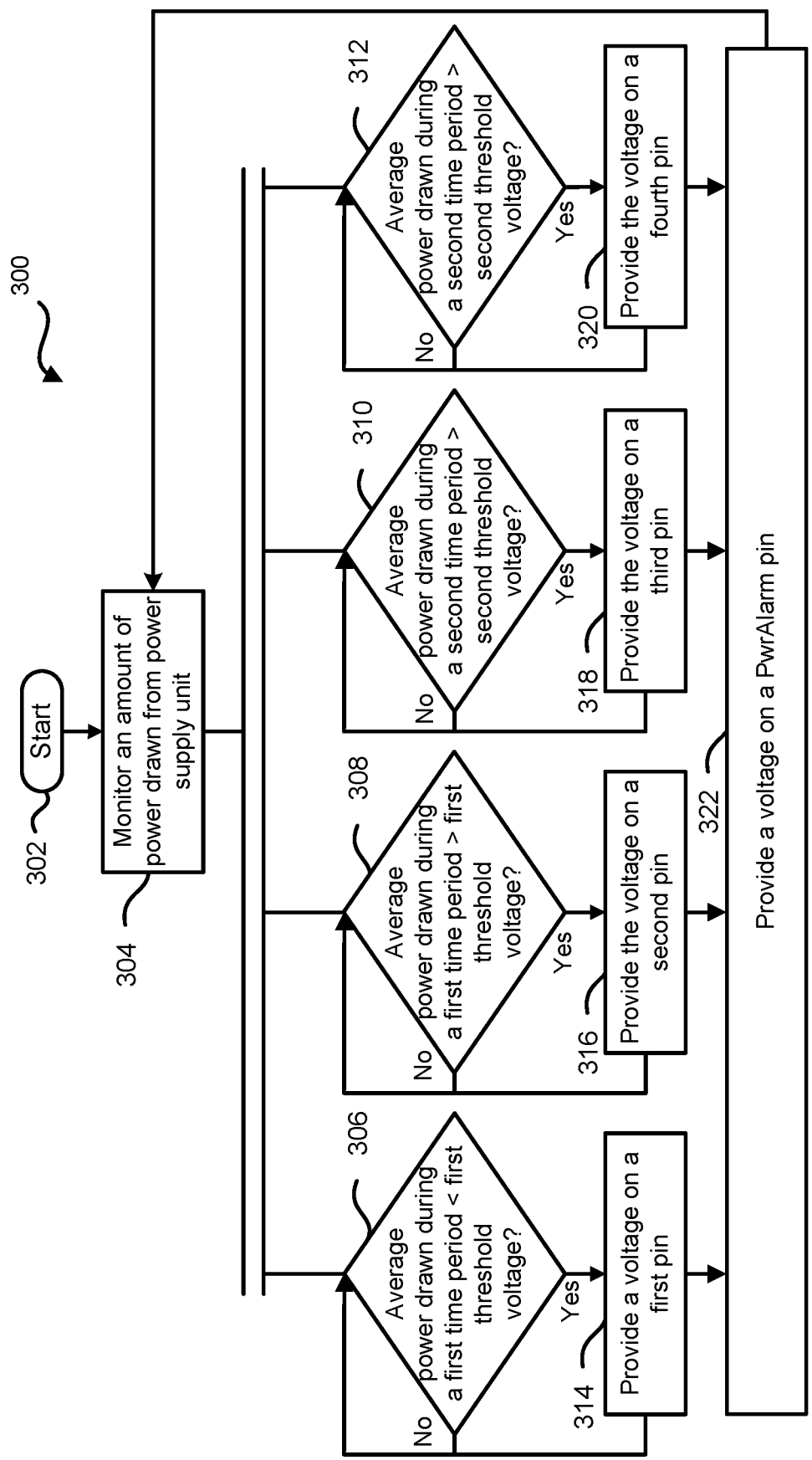
FIG. 3 is a flow diagram of a method for monitoring an average amount of power drawn from a power supply unit over different time periods according to at least one embodiment of the present disclosure.

FIG. 3 illustrates a flow diagram of a method 300 for monitoring an average amount of power drawn from a power supply unit over different time periods according to at least one embodiment of the present disclosure, starting at block 302. It will be readily appreciated that not every method step set forth in this flow diagram is always necessary, and that certain steps of the methods may be combined, performed simultaneously, in a different order, or perhaps omitted, without varying from the scope of the disclosure. FIG. 3 may be employed in whole, or in part, power monitoring circuitry 214 and digital-to-analog circuitry 216 of FIG. 2, or any other type of system, controller, device, module, processor, or any combination thereof, operable to employ all, or portions of, the method of FIG. 3.

At block 304, an average amount of power drawn from a power supply unit is monitored. In an example, the average amount of power may be monitored by any suitable device of an information handling system including, but not limited to, a power monitoring circuit of the power supply unit. In certain examples, blocks 306, 308, 310, and 312 may be performed in parallel by any suitable operation, such as an integral power monitor. In an example, the integral power monitor may determine average amounts of power during different periods of time.

At block 306, a determination is made whether the average amount of power drawn from the power supply during a first time period is less than a first threshold voltage. In an example, the first time period may be a rolling one second time window, and the first threshold voltage may be any suitable voltage that power supply unit may continually provide without shutting down. The first threshold voltage may include, but is not limited to, 90 Watts and 100 Watts. In response to the average amount of power during the first time period being less than the first threshold voltage, a voltage is provided on a first pin at block 314 and the flow continues at block 322. In an example, the voltage may be a digital value, such as a logical high value. At block 322, a voltage is provided on a pin connecting the power supply unit to the motherboard of the information handling system. In an example, the pin may be a power alarm (PwrAlarm) pin between the power supply unit and the motherboard. Based on the voltage on the first pin, any suitable voltage, such as 0 Volts, may be provided to the motherboard on the PwrAlarm pin.

At block 308, a determination is made whether the average amount of power drawn from the power supply during the first time period is greater than the first threshold voltage. In response to the average amount of power during the first time period being greater than the first threshold voltage, a voltage is provided on a second pin 316 and the flow continues at block 322. In an example, the voltage may be a digital value, such as a logical high value. At block 322, a first voltage is provided on the pin connecting the power supply unit to the motherboard. Based on the voltage being on the second pin, any suitable first voltage above the 0 Volts, such as 1.1 Volts, may be provided. In an example, the output voltage on may be a quantized representation of the digital inputs from blocks 314, 316, 318, and 320. For example, the voltage may be provided by coarse D/A circuitry with an analog output that may be segmented enough to avoid voltage precision errors of a full 10-bit D/A range.

At block 310, a determination is made whether the average amount of power drawn from the power supply during a second time period is greater than a second threshold voltage. In an example, the second time period may be a rolling millisecond time window, such as 10 milliseconds, 20 milliseconds, 30 milliseconds, or the like. The second threshold voltage may be any suitable voltage that power supply unit may provide during a short period of time without shutting down. In an example, the second threshold voltage including, but not limited to, 110 Watts and 120 Watts. In response to the average amount of power during the second time period being greater than the second threshold voltage, a voltage is provided on a third pin 318 and the flow continues at block 322. At block 322, a second voltage is provided on the pin connecting the power supply unit to the motherboard. Based on the voltage being on the third pin, any suitable second voltage, such as 2.2 Volts, above the first voltage may be provided.

At block 312, a determination is made whether the average amount of power drawn from the power supply during a third time period is greater than a third threshold voltage. In an example, the third time period may be a rolling millisecond time window, such as 10 microseconds, 20 microseconds, 30 microseconds, or the like. The second threshold voltage may be any suitable voltage that power supply unit may provide during a short period of time without shutting down. In an example, the second threshold voltage including, but not limited to, 200 Watts and 210 Watts. In response to the average amount of power during the second time period being greater than the second threshold voltage, a voltage is provided on a fourth pin 320 and the flow continues at block 322. In an example, the voltage may be a digital value, such as a logical high value. At block 322, a third voltage is provided on the pin connecting the power supply unit to the motherboard. Based on the voltage being on the fourth pin, any suitable third voltage, such as 3.3 Volts, above the second voltage may be provided.

Figure 4:
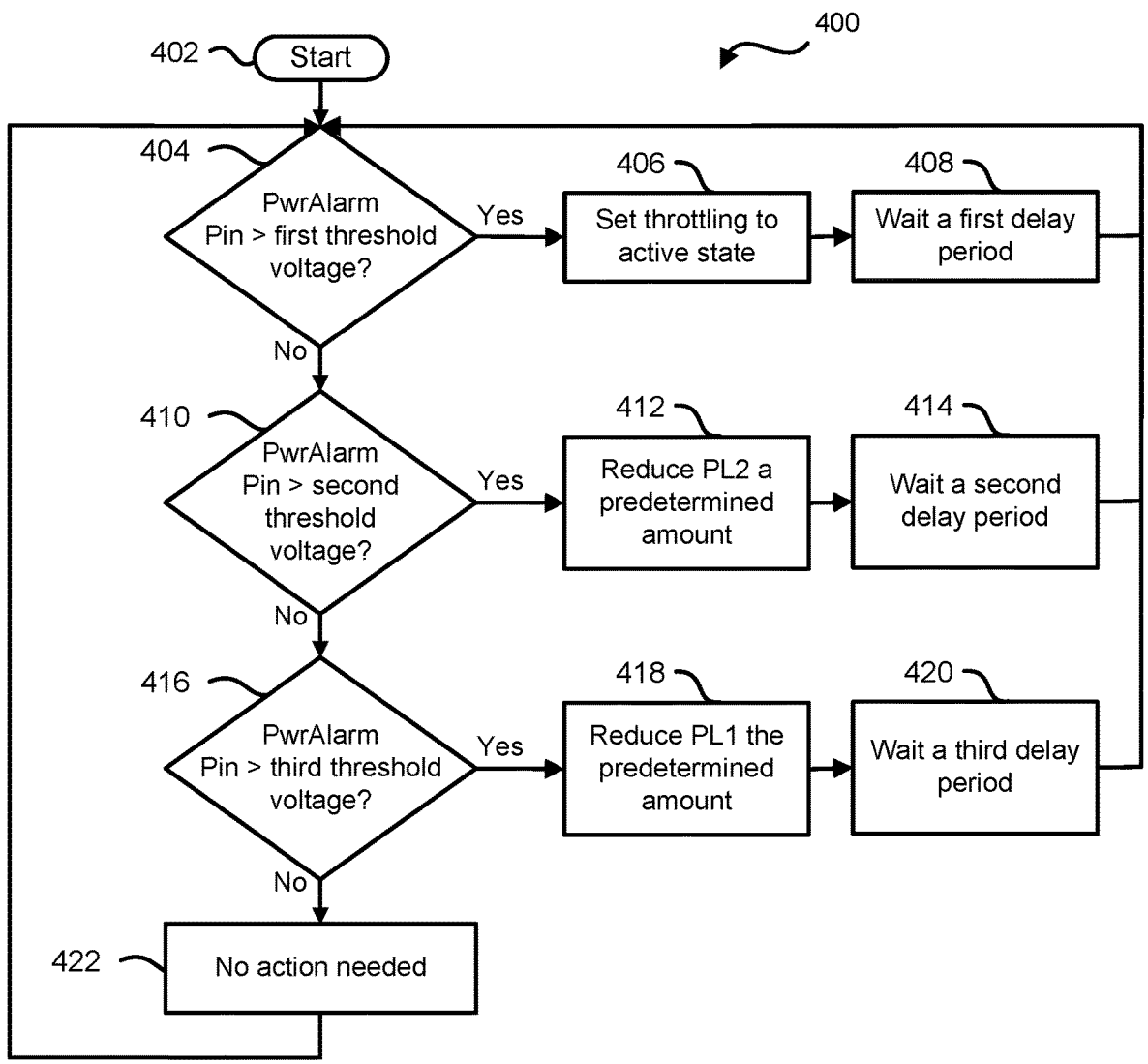
FIG. 4 is a flow diagram of a method for setting a power state of a processor based on a voltage level on a power alarm pin according to at least one embodiment of the present disclosure.

FIG. 4 illustrates a flow diagram of a method 400 for setting a power state of a processor based on a voltage level on a power alarm pin according to at least one embodiment of the present disclosure, starting at block 402. It will be readily appreciated that not every method step set forth in this flow diagram is always necessary, and that certain steps of the methods may be combined, performed simultaneously, in a different order, or perhaps omitted, without varying from the scope of the disclosure. FIG. 4 may be employed in whole, or in part, by embedded controller 220 of FIG. 2, or any other type of system, controller, device, module, processor, or any combination thereof, operable to employ all, or portions of, the method of FIG. 4.

At block 404, a determination is made whether a voltage on a PwrAlarm pin is greater than a first threshold voltage. In an example, the first threshold voltage may be any suitable voltage, such as 2.75 Volts. In response to the voltage on the PwrAlarm pin being greater than the first threshold voltage, a power throttling may be activated at block 406. In an example, the power throttling may be any suitable throttling command including, but not limited to, PROCHOT # and power-brake. At block 408, a first delay period is waited and the flow continues as stated above at block 404. In an example, the first delay period may be any suitable length of time including, but not limited to, 10 microseconds, 15 microseconds, and 20 microseconds. If the voltage on the PwrAlarm pin is not greater than the first threshold voltage, the flow continues at block 410.

At block 410, a determination is made whether the voltage on the PwrAlarm pin is greater than a second threshold voltage. In an example, the second threshold voltage may be any suitable voltage, such as 1.65 Volts. In response to the voltage on the PwrAlarm pin being greater than the second threshold voltage, a power level 2 limit is reduce by a predetermined wattage amount at block 412. In an example, the predetermined voltage amount may be any suitable voltage amount including, but not limited to, 5 Watts, 6 Watts, and 7 Watts. At block 414, a second delay period is waited and the flow continues as stated above at block 404. In an example, the first delay period may be any suitable length of time including, but not limited to, 5 milliseconds, 10 milliseconds, and 15 milliseconds. If the voltage on the PwrAlarm pin is not greater than the second threshold voltage, the flow continues at block 416.

At block 416, a determination is made whether the voltage on the PwrAlarm pin is greater than a third threshold voltage. In an example, the third threshold voltage may be any suitable voltage, such as 0.55 Volts. In response to the voltage on the PwrAlarm pin being greater than the third threshold voltage, a power level 1 limit is reduce by the predetermined wattage amount at block 418. At block 420, a third delay period is waited and the flow continues as stated above at block 404. In an example, the first delay period may be any suitable length of time including, but not limited to, 100 milliseconds, 110 milliseconds, and 115 milliseconds. If the voltage on the PwrAlarm pin is not greater than the third threshold voltage, the flow continues at block 422. At block 422, a determination is made that no power throttling action is needed, and the flow continues as stated above at block 404.

While the computer-readable medium 136 of information handling system 100 is shown in FIG. 1 to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to store information received via carrier wave signals such as a signal communicated over a transmission medium. Furthermore, a computer readable medium can store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

In the embodiments described herein, an information handling system includes any instrumentality or aggregate of instrumentalities operable to compute, classify, process, transmit, receive, retrieve, originate, switch, store, display, manifest, detect, record, reproduce, handle, or use any form of information, intelligence, or data for business, scientific, control, entertainment, or other purposes. For example, an information handling system can be a personal computer, a consumer electronic device, a network server or storage device, a switch router, wireless router, or other network communication device, a network connected device (cellular telephone, tablet device, etc.), or any other suitable device, and can vary in size, shape, performance, price, and functionality.

The information handling system can include memory (volatile (e.g. random-access memory, etc.), nonvolatile (read-only memory, flash memory etc.) or any combination thereof), one or more processing resources, such as a central processing unit (CPU), a graphics processing unit (GPU), hardware or software control logic, or any combination thereof. Additional components of the information handling system can include one or more storage devices, one or more communications ports for communicating with external devices, as well as, various input and output (I/O) devices, such as a keyboard, a mouse, a video/graphic display, or any combination thereof. The information handling system can also include one or more buses operable to transmit communications between the various hardware components. Portions of an information handling system may themselves be considered information handling systems.

When referred to as a "device," a "module," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device).

The device or module can include software, including firmware embedded at a device, such as a Pentium class or PowerPC™ brand processor, or other such device, or software capable of operating a relevant environment of the information handling system. The device or module can also include a combination of the foregoing examples of hardware or software. Note that an information handling system can include an integrated circuit or a board-level product having portions thereof that can also be any combination of hardware and software.

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims.

In the claims, means-plus-function clauses are intended to cover the structures described herein as performing the recited function and not only structural equivalents, but also equivalent structures.

What is claimed is:

1. An information handling system comprising:
 a power supply unit to provide power to components of the information handling system, the power supply unit including:
 power monitoring circuitry to:
 monitor the provided power;
 determine whether the provided power exceeds one of a plurality of threshold voltages during a respective one of a plurality of time periods, wherein the threshold voltages increase as an amount of time in the time periods decreases; and
 provide a digital value on one of a plurality of pins based on one of the threshold voltages being exceeded during the respective one of the plurality of time periods; and
 digital-to-analog circuitry to communicate with the power monitoring circuitry, the digital-to-analog circuitry to:
 detect the digital value on one of the pins; and
 provide one of a plurality of quantized voltages, wherein each of the quantized voltages corresponds to a different one of the pins; and
 a motherboard to communicate with the power supply unit, the motherboard to:
 receive the one of the quantized voltages; and
 activate a throttling operation based on the received one of quantized voltages.

2. The information handling system of claim 1, wherein the motherboard includes an embedded controller to perform the throttling operation on a processor of the information handling system.

3. The information handling system of claim 2, wherein the embedded controller includes a comparator to generate an embedded controller interrupt based on the one of the quantized voltages.

4. The information handling system of claim 1, wherein digital-to-analog circuitry further to:
 determine if the digital value is on more than one of the pins at substantially the same time; and
 in response to the digital value being on more than one of the pins at substantially the same time, provide one of the quantized voltages based on priority levels of the pins.

5. The information handling system of claim 1, wherein each of the threshold voltages is a maximum amount of power the power supply unit may provide during a corresponding time period.

6. The information handling system of claim 1, wherein each of the quantized voltages corresponds to a different throttling operation.

7. The information handling system of claim 6, wherein the different throttling operations includes reduction of a power level 1 wattage, reduction of a power level 2 wattage, and perform a power-brake throttle operations.

8. A method comprising:
 providing, by a power supply circuitry, power to components of an information handling system;
 monitoring, by power monitoring circuitry, the provided power;
 determining whether the provided power exceeds one of a plurality of threshold voltages during a respective one of a plurality of time periods, wherein each of the threshold voltages is a maximum amount of power the power supply circuitry may provide during a corresponding time period;
providing a digital value on one of a plurality of pins based on one of the threshold voltages being exceeded during the respective one of the plurality of time periods;
detecting, by digital-to-analog circuitry, the digital value on one of the pins;
providing one of a plurality of quantized voltages, wherein each of the quantized voltages corresponds to a different one of the pins;
receiving, by a motherboard of the information handling system, the one of the quantized voltages; and
activating a throttling operation based on the received one of quantized voltages.

9. The method of claim 8, further comprising:
performing, by an embedded controller of the motherboard, the throttling operation on a processor of the information handling system.

10. The method of claim 9, further comprising:
generating, by a comparator of the embedded controller, an embedded controller interrupt based on the one of the quantized voltages.

11. The method of claim 8, further comprising:
determining if the digital value is on more than one of the pins at substantially the same time; and
in response to the digital value being on more than one of the pins at substantially the same time, providing one of the quantized voltages based on priority levels of the pins.

12. The method of claim 8, wherein the threshold voltages increase as an amount of time in the time periods decreases based on a prioritization scheme.

13. The method of claim 8, wherein each of the quantized voltages corresponds to a different throttling operation.

14. The method of claim 13, wherein the different throttling operations includes reducing a power level 1 wattage, reducing a power level 2 wattage, and performing a power-brake throttle operations.

15. An information handling system comprising:
a power supply unit to provide power to components of the information handling system, the power supply unit including:
power monitoring circuitry to:
determine whether the provided power exceeds one of a plurality of threshold voltages during a respective one of a plurality of time periods;
provide a digital value on a first pin of a plurality of pins if the threshold voltages are not exceeded during the respective one of the plurality of time periods; and
provide the digital value on one of the remaining pins if one of the threshold voltages is exceeded during the corresponding time period; and
digital-to-analog circuitry to communicate with the power monitoring circuitry, the digital-to-analog circuitry to:
detect the digital value on one of the pins; and
provide one of a plurality of quantized voltages, wherein each of quantized voltages corresponds to a different one of the pins, wherein a first quantized voltage corresponds to the threshold voltages not being exceeded during the corresponding time periods; and
a motherboard to communicate with the power supply unit, the motherboard to:
receive the one of the quantized voltages, wherein each of the quantized voltages corresponds to a different throttling operation;
in response to the received quantized voltage being the first quantized voltage, determine that no action is needed; and
in response to the received quantized voltage being one of the remaining quantized voltage, activate a throttling operation based on the received one of quantized voltages.

16. The information handling system of claim 15, wherein the motherboard includes an embedded controller to perform the throttling operation on a processor of the information handling system.

17. The information handling system of claim 16, wherein the embedded controller includes a comparator to generate an embedded controller interrupt based on the one of the quantized voltages.

18. The information handling system of claim 15, wherein digital-to-analog circuitry further to:
determine if the digital value is on more than one of the pins at substantially the same time; and
in response to the digital value being on more than one of the pins at substantially the same time, provide one of the quantized voltages based on priority levels of the pins.

* * * * *